United States Patent [19]

Mitchell et al.

[11] 4,124,800

[45] Nov. 7, 1978

[54] METHOD FOR DETERMINING RESIDUAL OIL SATURATION OF A FORMATION

[75] Inventors: Forest R. Mitchell, Humble; Joseph D. Robinson; John P. Vogiatzis, both of Houston, all of Tex.

[73] Assignee: Shell Oil Company, Houston, Tex.

[21] Appl. No.: 708,463

[22] Filed: Jul. 26, 1976

[51] Int. Cl.² ............................................. G01V 5/00
[52] U.S. Cl. ................................................... 250/260
[58] Field of Search ................................. 250/259, 260

[56] References Cited

U.S. PATENT DOCUMENTS 2,446,588  8/1948  Herzog et al. ....................... 250/260
3,562,523  2/1971  Richardson ......................... 250/259
3,631,245  12/1971  Jorden .............................. 250/259
3,894,584  7/1975  Fertl ................................. 250/260

*Primary Examiner*—Harold A. Dixon

[57] ABSTRACT

A method for determining the residual oil saturation of a formation by the following steps: (1) injecting radioactive water into the formation; (2) logging the gamma response of the formation; (3) chemically flooding the formation to remove substantially all of the residual oil; (4) injecting radioactive water into the formation; (5) logging the gamma response of the formation; and (6) determining the residual oil saturation from the difference in the two gamma logs.

15 Claims, 4 Drawing Figures

METHOD FOR DETERMINING RESIDUAL OIL SATURATION OF A FORMATION

BACKGROUND OF THE INVENTION

The present invention relates to a method for determining the residual oil saturation of a hydrocarbon-producing formation penetrated by a borehole. In particular, the method pertains to a method for determining the residual oil saturation of a petroleum producing reservoir which has been reduced to a residual oil saturation by water displacement — either by natural or induced means. At the present time there is considerable interest in tertiary recovery methods for producing additional crude oil from old reservoirs. Several methods of tertiary recovery have been proposed. They are expensive to apply and whether they are economic depends to a large extent upon the oil remaining in place in the reservoir. In situations where it is feasible to drill a new borehole, various logging devices may be used to determine the residual oil remaining in the formation. Often, the economics of the project will not justify drilling a new borehole (or boreholes) for the sole purpose of determining the residual oil in place. Thus, measurements for determining the residual oil must be made using a previously drilled borehole that is cased with steel tubular members. The presence of steel casing in the borehole limits the types of logging devices that can be used to those that have the capability of logging a formation through steel casing. The devices are either pulsed neutron capture types or various other types of logging devices which measure the induced gamma of neutron activity of the formation.

Several patents have been issued which disclose what is known as a log-inject-log method using pulsed neutron capture logs to determine the residual oil present in a reservoir. For example, U.S. Pat. No. 3,562,523 describes a method for determining residual oil using a pulsed neutron capture tool in which the formation is first logged with the residual oil and water in place, the water phase is then replaced by water having a different neutron capture cross-section and the formation is again logged. By appropriate calculations the residual oil saturation may be deduced. Another U.S. Pat. No. 3,631,245 describes a similar method, but instead of the water being replaced, the oil is removed from the formation by using various chemical flooding or other methods. While one or both of these methods have been used for determining residual oil saturation, they are practiced only with difficulty due to the fact that both require the use of extremely sophisticated borehole devices and data treatment. In addition, knowledge as to thermal neutron diffusion effects is necessary and compensation in some manner must be made as pointed out in U.S. Pat. No. 3,852,593. Furthermore, the methods require either a knowledge of the porosity of the formation or the neutron capture cross-section of the residual oil. These parameters can be very difficult or impossible to obtain with the accuracy required in this type of application. The proposed method circumvents all of these deficiencies.

Another U.S. Pat. No. 3,894,584 describes a method for determining residual oil in which the natural radioactivity of the formation is measured followed by injection into the formation of an aqueous solution containing radioactive tracer elements. The formation is again logged and the oil removed from the formation by a chemical flooding or other method. After the oil is removed from the formation, the chemical flooding agent is removed by injecting the original formation water or brine in the zone and the formation again logged. From the three logs plus the porosity of the formation one can presumably determine the residual oil saturation of the formation. While this method may produce satisfactory results, it does contain unnecessary steps and in addition, fails to solve other problems. For example, the method requires three separate logging runs in the formation and requires that one know the porosity of the formation quite accurately in order to calculate the residual oil saturation accurately. Further, since the method makes no provisions for compensating for the radioactivity of the borehole fluid, there is an additional serious question concerning the accuracy of the results obtainable.

BRIEF SUMMARY OF INVENTION

The present invention provides an improved means for determining the residual oil saturation using radioactive tracers. In particular, the method comprises steps of first replacing the indigenous water in the formation of interest with water containing a radioactive tracer. This can best be accomplished by providing an aqueous solution of the radioactive tracer of known specific activity and injecting it into the formation taking care not to remove the trapped oil, i.e., using low displacement rates and no more volume than is necessary. After the radioactive tracer has been injected into the formation, the remaining radioactive material in the borehole is removed preferably by positioning an inflatable packer element in the borehole and inflating it until all of the borehole fluid adjacent to the formation of interest is displaced. The formation is then logged from inside the inflatable packer element to obtain the gamma ray log. After the formation is logged the inflatable packer is collapsed and withdrawn and the formation chemically flooded or flooded by other means to remove substantially all of the residual oil from the formation near the wellbore. The chemical flood is followed by a second injection of water of known specific activity containing the radioactive tracer to remove the chemical flooding material or other displacing materials from the formation and replace them with water containing the radioactive tracer. The inflatable packer is again positioned opposite the same zone of interest as before and inflated to displace the radioactive water from the wellbore in the interval. The formation is logged a second time inside the inflatable packer element to provide a second gamma ray log.

In both injections of water containing the radioactive material, a sufficient concentration is used so that the gamma level of the water exceeds the natural gamma activity of both the formation and the residual oil by a factor of at least 100 to 1,000. This will insure that the natural radioactivity of the formation and the residual oil contributes less than 0.1 percent to the final calculation of residual oil saturation.

The residual oil saturation for discrete levels can then be determined by subtracting the radiation measurements made during the first gamma ray log from those of the second gamma ray log and dividing the resultant by those of the second gamma ray log, both logs being corrected to the same basis with the known specific activities of the two injection fluids. The development of this expression is based on the fact that the radiation measured will be directly proportional to the volume of the radioactive aqueous phase present both before and after displacement of residual oil.

For example,

ROS = fraction of pore volume occupied by oil = (volume oil/volume pore space), $GR_1$ = radiation measurement with residual oil and aqueous phase (1) in formation corrected to the same specific activity as aqueous phase (2) if aqueous phases (1) and (2) have different specific activities; proportional to volume water present/unit volume of formation, $GR_2$ = radiation measurement with only aqueous phase (2) present in formation; proportional to pore volume present/unit volume of formation.

Therefore, $GR_2 - GR_1$ is proportional to volume residual oil previously present in formation, and $$ROS = (GR_2 - GR_1/GR_2)$$

A further refinement is developed where conditions seem to warrant it. A very small amount of radioactive aqueous phase may still exist in essentially film form between the inflatable packer element and the casing of the well. A background measurement, BG, of this radioactivity can be made in a borehole containing a radioactive aqueous phase by (1) inflating the packer in an interval where no injection has occurred, and (2) performing logging measurements as before and (3) correcting the background measurement to the same specific activity as the $GR_1$ and $GR_2$ measurements. The expression would then become:

$$ROS = (GR_2 - GR_1/GR_2 - BG)$$

Thus, we compensate for residual radioactivity in the borehole.

This method provides a substantial improvement in means for obtaining residual oil saturation inasmuch as (1) it is not necessary to know or measure the porosity of the formation, (2) it is not necessary to utilize a highly sophisticated logging device such as the pulsed neutron capture device, and (3) it is not necessary to treat certain complex physical phenomena such as thermal neutron diffusion effects rigorously. The porosity independence aspect is extremely important in geologic formations having porous hydrocarbon-bearing rock existing in a laminated configuration, that is, layered with non-reservoir rocks such as shale, tight non-hydrocarbon bearing siltstones, or dense carbonates, anhydrites, etc. In many situations, studies have shown that resolving power of the logging devices is not adequate to measure porosity of the reservoir rocks with required accuracy under these conditions. In addition, many existing wells, in which the determination of residual oil saturation is important, have no accurate porosity data from either cores or wireline logging measurements. Even modern logging devices are often inadequate in the cased hole situation due to limited depth of investigation, shaliness, lithology variations, etc. Accordingly, the development of a method which is independent of porosity determination is indeed an advantage.

Furthermore, if one provides an aqueous solution of sufficient radioactivity, it is possible to substantially eliminate the effect of natural radioactivity in the formation and residual oil. This is relatively straightforward by either counting only gamma rays of the radioactive isotope (for example iodine 131) or by using a sufficiently high concentration of the isotope.

The use of radioactive iodine and a number of other radioactive materials is routine in oilfield operations and does not harm the formation due to incompatibility with reservoir rocks or most materials used in flooding of hydrocarbon reservoirs. Iodine 131 is commonly used in tracing injection profiles, and its half-life is relatively short so that with the usual precautions its radioactivity will not result in hazard to life during subsequent production from the reservoir.

While the use of an inflatable packer element to remove the water containing the radioactive tracer is one method for eliminating or reducing the effects of radioactivity in the borehole, other means have also been devised as will be discussed later.

BRIEF DESCRIPTION OF THE DRAWINGS

The invention will be more easily understood from the following detailed description when taken in conjunction with the attached drawing in which.

PREFERRED EMBODIMENT

Figure 2:
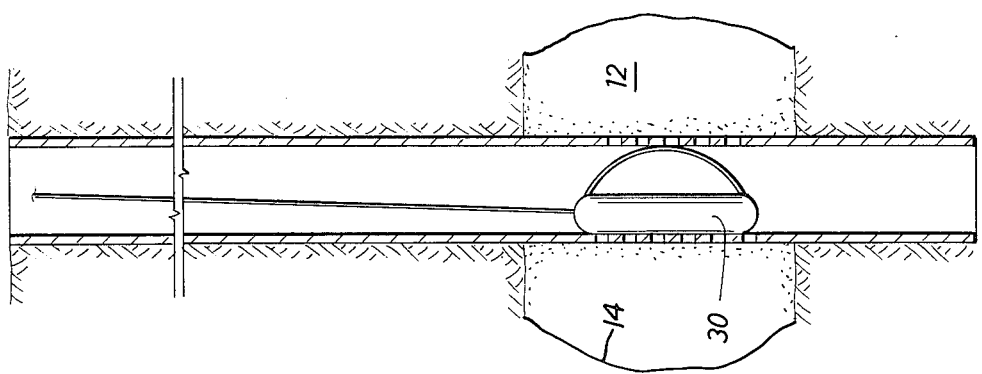
FIG. 2 shows the use of an inflatable packer element to force all of the radioactive water into the formation while logging.
Figure 1:
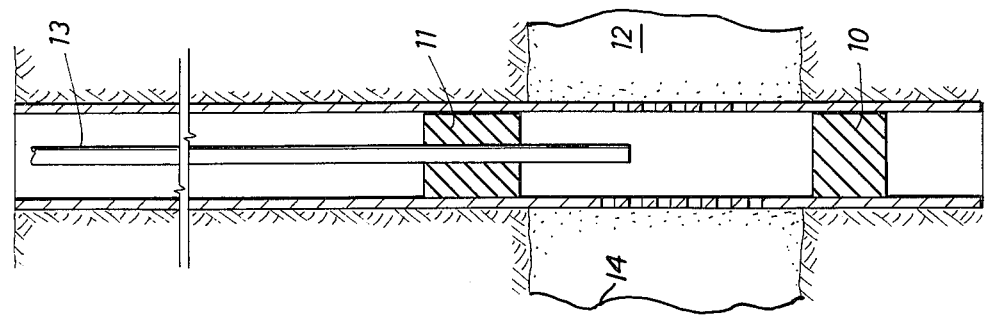
FIG. 1 shows the injecting of an aqueous solution of radioactive tracer in the formation.

As explained above, the present invention is directed primarily to determining the residual oil saturation in a reservoir which has been encroached by water. In particular, the invention is to be generally applied using a previously drilled borehole which has been cased with steel tubular members. The method is, however, applicable in open wells (uncased) provided reasonably uniform borehole walls exist. The first step, as shown in FIG. 1, in carrying out the method of the present invention is to inject an aqueous solution of a radioactive tracer into the formation, sufficient solution being injected to insure that the tracer penetrates a radial distance 14 around the borehole substantially equal to the radius of investigation of the gamma ray logging tool. Normally, a distance of three feet from the borehole will be sufficient. The radioactive tracer can be injected into the borehole by preparing an aqueous solution of a suitable radioactive isotope, for example iodine 131, and measuring the specific activity of the solution. The injection is carried out by setting packers 10 and 11 above and below (if necessary) the completed interval 12 of the well and pumping through a pipe 13, a sufficient quantity of radioactive water into the formation between the two packers. After the radioactive water has been injected into the formation the packers are withdrawn and, as shown in FIG. 2, a suitable inflatable packer element 20 positioned in the well across the completed interval, for example, a tubular impression member similar to the one described in U.S. Pat. No. 3,046,601 may be used. The member described in this patent, it can be expanded into intimate contact with the interior wall of the casing to displace essentially all of the radioactive material from the borehole opposite the interval to be investigated. In order to obtain useful results, it is necessary to exclude or otherwise remove all or essentially all of the radioactive water from the wellbore itself, across the interval to be investigated. It can easily be shown that a film of only 0.025 centimeters on the inner surface of the casing will contribute about 3% of the total gamma signal being detected from water-activated formation of 30% porosity. In contrast, if no steps are taken to exclude the radioactive water from the well, the signal contributed by the radioactive water in the interior of the casing will contribute approximately 90% of the signal when the formation has a porosity of approximately 30%.

After the inflatable packer element has been expanded in the borehole, the objective formation 12 can be logged with a gamma detector 21 by inserting the logging tool into the packer element using a wireline 22. Normally, suitable flexible members of 10 to 20 feet in length can be provided which, on occasion, may necessitate positioning the member, logging a portion of the formation and then moving the member to log the remainder of the formation in the case of very thick objective formations.

Figure 3:
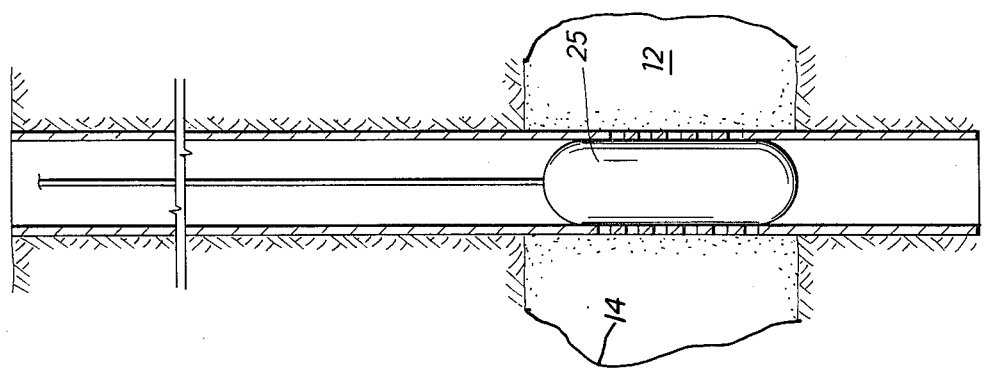
FIG. 3 shows the use of a logging tool having an inflatable outer sleeve for excluding the radioactive water.
Figure 4:
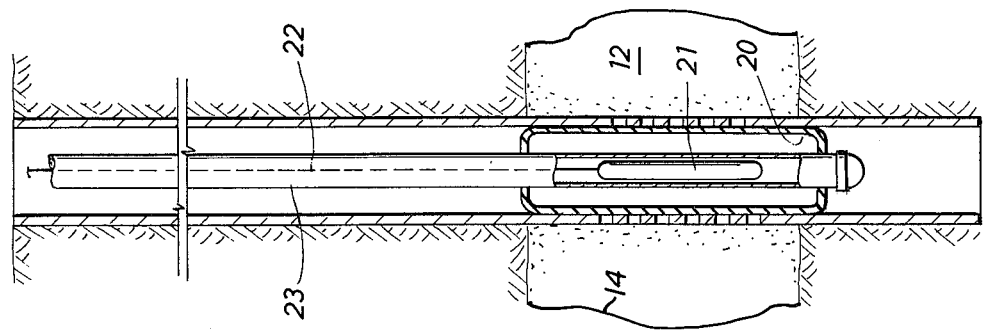
FIG. 4 shows the use of a logging device pressed against the casing to exclude the radioactive water.

While it is preferred to use an expandable member to physically displace the radioactive water from the borehole, other means may also be used. For example, it may be feasible in some cases to determine the quantity of radioactivity produced by the borehole fluid opposite a nonpermeable formation. The resulting measurement can be subtracted from the measurements obtained opposite the formation of interest. An example, as shown in FIG. 3, might be in a close clearance situation between logging device 25 a inside well diameter such as could occur in small wellbores or in cases where the logging device was equipped with, say a neoprene fluid-excluding sleeve. Another example, as shown in FIG. 4, would be an eccentered device (shielded on the backside) which would exclude most of the borehole fluid effects but would not in all probability render them negligible. It is also possible to follow the injection of the aqueous solution of radioactive tracer with a nonradioactive material which will not invade the formation. For example, certain suitable drilling or completion fluids can be used to displace the radioactive water into the formation without overdisplacement.

After the first gamma log of the formation is obtained, the inflatable packer element is withdrawn from the well and the objective formation chemically flooded or flooded by other means to remove substantially all of the residual oil near the wellbore. A suitable method for chemically flooding a formation to remove the residual oil is described in U.S. Pat. No. 3,631,245. In addition, of course, many other chemical, alcohol and surfactant flooding methods are described in the published literature. After the formation has been cleared of residual oil, an aqueous solution of radioactive tracer is again injected into the objective formation to displace all of the chemical or driving solutions, polymers, etc. The specific activity of the second solution should be determined. Following the second injection, the inflatable packer is repositioned in the borehole and expanded to displace all or essentially all of the aqueous solution out of the borehole as before. A second gamma log is then obtained of the objective formation in the same manner as the first one.

The residual oil saturation can be determined directly from the two gamma logs by subtracting radiation measurements made during the first log from those of the second gamma log and dividing by those of the second log, both readings being adjusted to the same specific activity of injection fluid. This will give the residual oil saturation as a fraction of reservoir porosity. As explained above, if steps are taken to insure that the gamma activity of the injected water is sufficiently high compared to the natural gamma activity of both the formation and the residual oil, the natural gamma activity of the formation can be neglected.

As described above, the gamma ray measurements can be compensated for the effect of the film of aqueous solution remaining on the inner wall of the tubular member. The compensating measurement is obtained opposite a portion of the well casing that is free of perforations. This portion of the well is filled with the aqueous radioactive solution and the inflatable packer element positioned and expanded to force essentially all of the solution from this portion of the borehole. A gamma log can then be obtained from inside the packer which can then be used to compensate the previous measurements for the effect of the film of aqueous solution remaining on the casing surface.

We claim as our invention:

1. A method for determining the residual oil saturation of a formation penetrated by a borehole, said formation having been reduced to residual oil saturation by natural or induced water or aqueous solution displacement, said method comprising:
   injecting an aqueous solution of a gamma emitting radioactive tracer of known specific activity into the portion of said formation surrounding the borehole to substantially remove all of the indigenous water in the formation, but not the oil for a radius of interest;
   measuring the gamma response of the portion of the formation surrounding the borehole to obtain a first gamma log;
   chemically or otherwise flooding the portion of the formation surrounding the borehole to remove substantially all the residual oil;
   injecting sufficient aqueous solution of a gamma emitting radioactive tracer of known specific activity into the portion of the formation surrounding the borehole to remove all of the chemical or other flooding material plus any driving fluids from the formation for the radius of interest;
   measuring the gamma response of the portion of the formation surrounding the borehole to obtain a second gamma log; and
   determining the residual oil saturation from the first and second gamma logs and the known specific activities of the injected solutions.

2. The method of claim 1 and in addition displacing all or substantially all of the aqueous solution of gamma emitting radioactive tracer from the borehole prior to measuring the gamma response of the formation to obtain the first and second gamma logs.

3. The method of claim 1 wherein the aqueous solution of radioactive tracer comprises water from the formation plus the addition of a radioactive tracer material.

4. The method of claim 3 wherein the radioactive tracer is iodine 131.

5. The method of claim 3 wherein sufficient radioactive tracer material is added to the formation water to cause the gamma activity of the injected water to exceed the natural gamma activity of the formation with its natural fluids by a factor 100 − 100.

6. The method of claim 2 and in addition obtaining a measurement of the gamma response of the film of aqueous solution remaining on the wall of the interior surface of the borehole after the radioactive aqueous solution has been displaced from the borehole and using said measurement of gamma response to compensate said other measurements of gamma response for the effect of said film of radioactive aqueous solution.

7. The method of claim 6 wherein said measurement of the gamma response of said film of aqueous solution is obtained opposite a non-permeable formation in an uncased well.

8. The method of claim 6 wherein said borehole is cased with a tubular member and the measurement of the gamma response of said film of aqueous solution is made opposite a portion of said tubular member that is free of perforations.

9. A method for determining the residual oil saturation of a formation penetrated by a borehole, said formation having been reduced to residual oil saturation by natural or induced water or aqueous solution displacement, said method comprising:
  removing the indigeous water from the formation surrounding the borehole while leaving the residual oil in place by injecting an aqueous solution of a gamma emitting radioactive tracer, said aqueous solution having a known activity;
  measuring the gamma response of the formation while minimizing the response of any fluids in the borehole to obtain a first gamma log;
  removing the residual oil from the formation surrounding the borehole by chemically flooding the formation;
  injecting sufficient aqueous solution of gamma emitting radioactive tracer into the formation to remove the chemical flood material, and replacing all formation fluids with the aqueous solution, said aqueous solution having a known activity;
  measuring the gamma response of the formations while minimizing the response of any fluids in the borehole to obtain a second gamma log; and
  determining the residual oil saturation from the first and second gamma logs.

10. The method of claim 9 wherein the first-mentioned aqueous solution is miscible in the indigeous water and immiscible in the residual oil.

11. The method of claim 10 wherein the response of any fluids in the borehole during the first and second gamma measurements is minimized by removing substantially all of the aqueous solution from the borehole.

12. The method of claim 11 wherein said aqueous solution is removed by installing an inflatable packer element adjacent the formation, and inflating the packer element to displace the aqueous solution from the borehole into the formation.

13. The method of claim 12 wherein the inflatable packer element includes means for measuring the gamma response of the formation.

14. The method of claim 9 wherein said first- and second-mentioned aqueous solutions have substantially the same radioactivity.

15. The method of claim 14 wherein said activity is at least 100 times greater than the natural radioactivity of the formation and fluids.

* * * * *

UNITED STATES PATENT OFFICE
CERTIFICATE OF CORRECTION

PATENT NO. : 4,124,800

DATED : November 7, 1978

INVENTOR(S) : FORREST R. MITCHELL, JOSEPH D. ROBINSON, JOHN P. VOGIATZIS

It is certified that error appears in the above-identified patent and that said Letters Patent are hereby corrected as shown below:

In Column 3, lines 17-19, the equation should read:

$$ROS = (GR_2 - GR_1) / GR_2$$

In Column 3, lines 32-34, the equation should read:

$$ROS = (GR_2 - GR_1) / (GR_2 - BG)$$

Signed and Sealed this

Third Day of July 1979

[SEAL]

Attest:

Attesting Officer

LUTRELLE F. PARKER

Acting Commissioner of Patents and Trademarks